Figure 1:
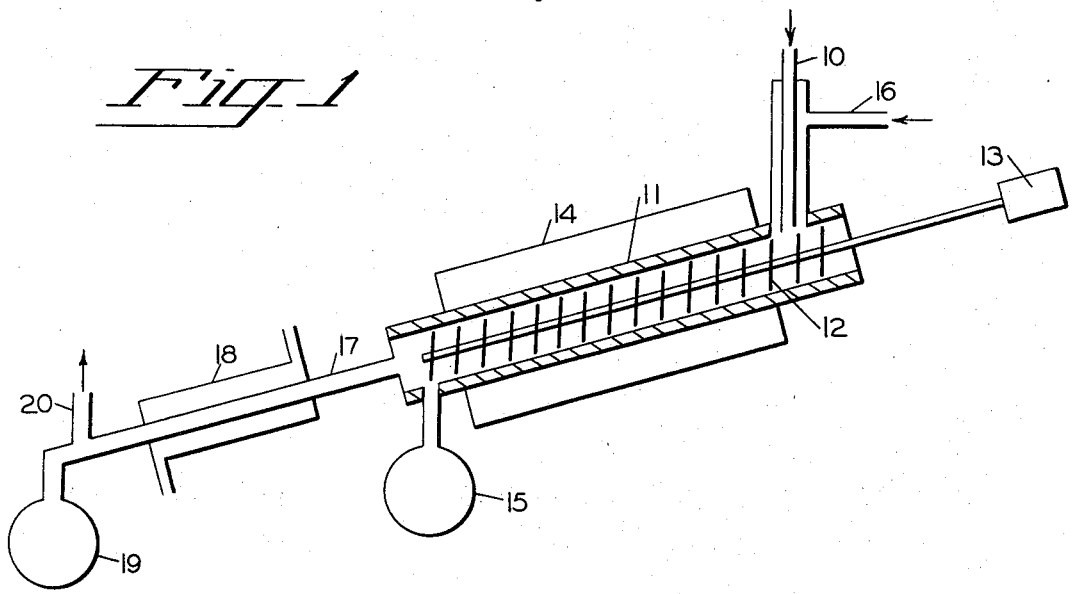

March 26, 1968  D. W. GOHEEN ET AL  3,375,283

PREPARATION OF METHOXY PHENOLS FROM SPENT PULPING LIQUORS

Filed Sept. 26, 1966

INVENTORS.
DAVID W. GOHEEN
JOHN B. MARTIN
BY Robert E. Howard
ATTORNEY

United States Patent Office 3,375,283
Patented Mar. 26, 1968

3,375,283
PREPARATION OF METHOXY PHENOLS FROM SPENT PULPING LIQUORS
David W. Goheen and John B. Martin, Camas, Wash., assignors to Crown Zellerbach Corporation, San Francisco, Calif., a corporation of Nevada
Continuation-in-part of application Ser. No. 475,834, July 29, 1965. This application Sept. 26, 1966, Ser. No. 584,632
14 Claims. (Cl. 260—613)

This application is a continuation-in-part of application Ser. No. 475,834, filed July 29, 1965, and now abandoned.

This invention relates to the preparation of methoxy phenols and lower alkyl substituted methoxy phenols from the waste liquors or pulping operations.

In the chemical pulping of wood to obtain cellulose fibers therefrom for the manufacture of paper, about 50% by weight of the wood is removed by the cooking liquor as non-fibrous material. A major proportion of this non-fibrous material is lignin which is a polymeric material made up of substituted phenyl propane monomeric units. Waste liquor from the pulping process containing this non-fibrous material is burned in recovery furnaces to recover the inorganic pulping chemicals and heat values. Thus, the organic material contained therein is used only for its fuel value.

Many efforts have been made recently to obtain useful chemical products from this non-fibrous waste material. It is known that dimethyl sulfide and methyl mercaptan may be obtained from lignin-containing waste liquors obtained from pulping processes. For example, a method has recently been described in copending application, Ser. No. 417,793, for obtaining primarily methyl mercaptan from lignin-containing waste liquors. Briefly, the process of copending application, Ser. No. 417,793, filed Dec. 11, 1964 and now Patent No. 3,326,980, comprises evaporating waste pulping liquors essentially to dryness, tumbling the resultant solids while subjecting said solids to mild pyrolysis, and continuously removing methyl mercaptan vapors as they are formed.

It has now been found that the process described in co-pending application, Ser. No. 417,793, may be modified to produce methoxy phenols and lower alkyl substituted methoxy phenols. The production of these methoxy phenols from waste liquor is accomplished by evaporating the waste liquor essentially to dryness, subjecting the resulting solids to rapid pyrolysis at a temperature of from 300° to 600° C., continuously and rapidly removing and condensing the pyrolyzate, and recovering and purifying the methoxy phenols and lower alkyl substituted methoxy phenols from the resulting oil.

The methoxy phenols obtained are, principally, guaiacol and 2,6-dimethoxyphenol. Guaiacol and 2,6-dimethoxyphenol are both obtained in roughly equal proportions where the waste liquor employed is derived from the pulping of hardwoods due to the presence, in roughly equal proportions, of guaiacylpropane and syringylpropane monomeric units in the lignin polymer. Where the waste liquor employed is derived from coniferous woods, the methoxy phenol obtained will be principally guaiacol with only a very minor portion of 2,6-dimethoxyphenol being obtained since the guaiacylpropane unit predominates in the coniferous lignin polymer.

Guaiacol is a basic chemical useful for synthesis of many organic compounds, such as vanillin and catechol. It is also useful for producing resins, as a bacteriastat, and as an expectorant.

The 2,6-dimethoxyphenol can be demethylated by conventional procedures, such as treatment with strong sulfuric acid, to 1,2,6-trihydroxybenzene (pyrogallol) which is useful as a photographic developer and for the absorption of oxygen in gas analysis.

Figure 2:
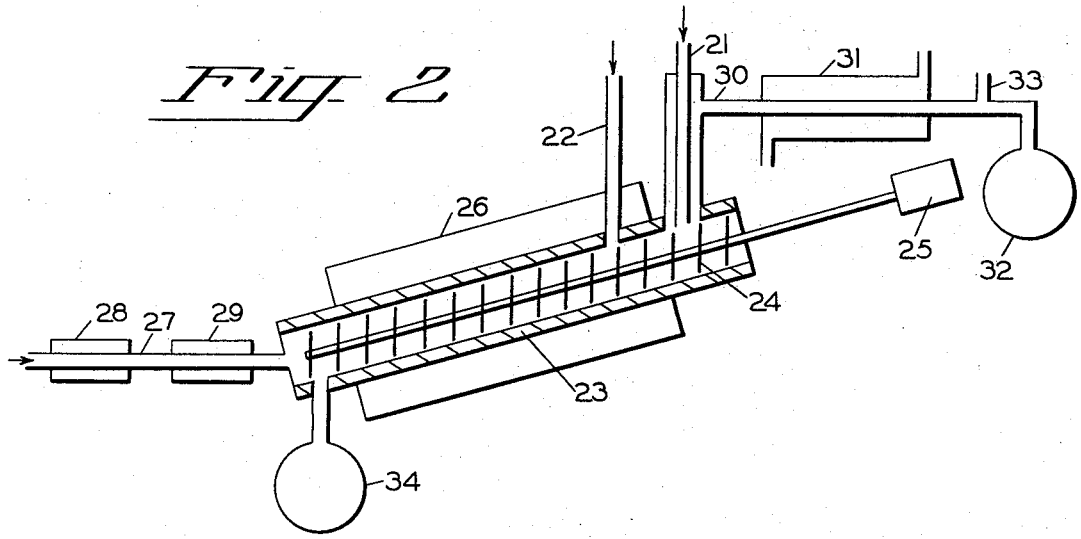

An understanding of the invention is facilitated by reference to the drawing, in which:

FIGURE 1 is a sectional side view of one form of apparatus suitable for practicing the herein described process; and FIGURE 2 is a sectional side view of another form of apparatus suitable for practicing the process described herein.

The starting material for the production of the methoxy phenols and lower alkyl substituted methoxy phenols, in a preferred embodiment of the process, comprises waste liquor from sulfate (kraft) pulping, referred to in the art as "black" liquor. Black liquor contains about 16% by weight solids as it comes from the washers. These solids are the reacted cooking chemicals, which are various sodium salts, such as sodium carbonate, sodium hydroxide, sodium sulfide, sodium sulfate, sodium sulfite and others, as well as modified lignin removed from the wood chips in the pulping operation. Black liquor is conventionally concentrated to solids content of about 40% to 60% by weight in evaporators and then burned in a recovery furnace to recover inorganic cooking chemicals therefrom, the combustion being supported by the lignin and other organic wood extracts.

The concentrated black liquor is dried substantially to dryness in the same manner as that disclosed in co-pending application, Ser. No. 417,793. The concentrated black liquor contains about 40% to 60% total solids and has a pH in a range of 9 to 13, preferably 11 to 13. The temperatures employed in drying the liquor to dryness should be maintained below about 150° C., to prevent premature evolution of methoxy phenol-containing pyrolyzate, but high enough to effect the drying at a reasonable rate, preferably above about 100° C. The drying is effected by any conventional drying means, such as spray drying, or combination of drying means as long as the temperature limitations just mentioned are observed. The drying may be effected in the same means employed to effect the pyrolysis, or a separate means, or by a combination of the two.

The dried solids are then subjected to rapid pyrolysis at temperatures of from about 300° C. to 600° C., preferably at from about 350° C. to 500° C. Below about 300° C., methyl mercaptan is evolved as the predominant pyrolyzate. Above about 600° C., the lignin is carbonized and is extensively degraded into gaseous and solid materials of a complex nature having little value. During pyrolysis it is extremely important to rapidly and continuously remove the pyrolyzate from the pyrolysis zone, otherwise the pyrolyzate is rapidly broken down into a useless mixture of phenolics and other materials. This rapid removal of the pyrolyzate from the reaction zone is effected by a combination of factors employed in the herein described process.

One of the factors involved is that the black liquor is dried to a solid which is formed into particles of a relatively small size. This formation into particles may be effected in the pyrolysis zone, in a separate operation by conventional grinding means, by the drying operation itself (e.g., by spray drying) or by a combination of these or other expedients. A particle size in the range of from about 20 to about 200 mesh (U.S. Sieve) is preferred. Particles having sizes larger than about 20 mesh do not permit as effective heat transfer and pyrolyzate evolution as do smaller sizes. Particles having sizes smaller than about 200 mesh tend to agglomerate into larger masses which reduces efficiency of heat transfer and pyrolyzate evolution. Particles having sizes outside this range may be employed, but at the expense of efficiency.

The breakup of the liquor solids into small particles is partially or fully effected by tumbling the dry material in the pyrolysis zone, preferably in the presence of rods or balls to aid in the breakup. As used herein, the word "tumbling" means any procedure for moving the dried liquor solids about in the pyrolysis zone to effect uniformity of heating and uniformity of exposure of the surface of the individual particles to free space in the zone. By effecting the pyrolysis upon small particles which are continually in motion and, therefore, more uniformly exposed to the pyrolysis temperatures, the pyrolyzate containing methoxy phenols and lower alkyl substituted methoxy phenols is more easily evolved from the individual particles and escapes into the free space of the pyrolysis zone, where it is rapidly removed.

A further and perhaps primary factor which aids in the rapid removal of the methoxy phenol-containing pyrolyzate from the pyrolysis zone is the employment of steam or some inert gas to sweep the pyrolyzate from the pyrolysis zone as quickly as it is formed. Any suitable inert gas may be employed for this purpose. The term "inert gas" as employed herein is defined as any gas which is, substantially, not reactive with methoxy phenols or lower alkyl substituted methoxy phenols. Exemplary of such gases, in addition to steam, are nitrogen, helium, argon, neon, carbon monoxide, carbon dioxide, and mixtures thereof.

The pyrolyzate is led from the pyrolysis zone to a water cooled condenser, and an oil rich in methoxy phenols and lower alkyl substituted methoxy phenols is obtained as the condensate. Noncondensed gases, which contain primarily carbon monoxide, carbon dioxide, methyl mercaptan and hydrogen sulfide may be removed and burned in furnaces for the recovery of heat values therefrom, or fed through a Dry Ice cooled condenser for recovery of the methyl mercaptan. The methoxy phenols and lower alkyl substituted methoxy phenols are by far the major phenolic component of the oil. Other compounds present in the oil are m,p-cresol, o-cresol, phenol, m,p-ethyl phenol and small amounts of other compounds.

The pyrolysis residue, which amounts to about 70–75% of the original solids of the black liquor, contains organic residues and is composed of small particles suitable for addition to concentrated black liquor entering a conventional kraft recovery furnace. The heat of combustion of these pyrolysis residue solids is about 5160 B.t.u. per pound, as compared with about 6000 B.t.u. per pound for black liquor solids itself.

The methoxy phenols and lower alkyl substituted methoxy phenols may be recovered from the condensate oil by simple distillation, evaporation, solvent extraction, or combinations of these conventional expedients. One purification procedure that may be employed is to extract the methoxy phenols and lower alkyl substituted methoxy phenols from the condensate oil with a solvent such as benzene, followed by distillation of the methoxy phenols and lower alkyl substituted methoxy phenols from the solvent mixture. The methoxy phenols are then separated from each other and from the lower alkyl substituted methoxy phenols by fractionation.

Various suitable means may be employed for moving the liquor solids through the pyrolysis zone. Rotary or screw kilns may be employed. Fluidized beds may also be employed. The solids should be indirectly heated by application of heat from the outside of the kiln or bed to avoid mixing products of combustion with the pyrolyzate and to avoid exposing the pyrolyzate to hot zones where it can burn.

Pulping waste liquors other than sulfate waste liquors may also be employed in the process of this invention. Thus, sulfite spent liquors may also be used. The ash residue, however, cannot be routinely burned in a recovery operation, especially if the calcium base system is used. The residue from magnesium base spent liquors may be suitable for burning in a recovery system. Liquors resulting from the soda pulping process have also been employed successfully by this invention.

One suitable apparatus for carrying out the processes mentioned is illustrated in FIGURE 1. In the embodiment illustrated in this figure, waste liquor from a suitable source (not illustrated) is fed into conduit 10, which opens into pyrolysis kiln 11. The black liquor may be either dried liquor solids or concentrated liquor having a solids content in the neighborhood of 40% to 60%. Screw 12, driven by motor 13 at a suitable speed, carries the waste liquor material through the pyrolysis zone which extends the length of kiln 11 corresponding to the length of surrounding heater means 14. The heater may be a gas burner, electric resistance heater, steam jacket, fused salt bath, or other conventional heating means. The solids residue emitting from the pyrolysis zone is received into solids residue receiver 15. Steam is introduced into conduit 16 and sweeps through the kiln carrying with it the pyrolyzate formed in the pyrolysis zone. From the pyrolysis zone the pyrolyzate is carried by the steam through conduit 17 and into condenser 18 which surrounds conduit 17. From the condenser the condensed pyrolyzate goes into receiver 19, and is in the form of an oil. Noncondensable gases are removed via conduit 20. As may be seen from the drawing, the kiln is at an angle to the horizontal. This configuration aids in moving the material through the pyrolysis zone. The angle employed is not critical, and the optimum angle for a particular system is readily determinable.

Another suitable apparatus for practicing the herein described process is illustrated in FIGURE 2. Waste liquor from a suitable source (not illustrated) is fed into either inlet 21 or 22, or both, which open into pyrolysis kiln 23. Screw 24, driven by motor 25, carries the waste liquor material through the pyrolysis zone which extends the length of the kiln 23 corresponding to the length of surrounding heating means 26. The heating means 26 is any conventional heating means, such as those described previously herein. Steam is introduced from a source (not shown) via conduit 27 through superheaters 28 and 29 into kiln 23. The steam sweeps vapors containing methoxy phenols out of kiln 23 and past incoming liquor through conduit 21 into pyrolyzate outlet 30. Condenser 31 condenses the pyrolyzate-steam mixture, which is then collected in pyrolyzate condensate receiver 32. Noncondensables are evacuated via conduit 33. The pyrolysis residue solids, after having traversed the length of kiln 23 countercurrent to the flow of steam, are collected in residue receiver 34.

The following examples illustrate specific embodiments of the herein described process as employed with the waste liquor from coniferous wood pulping. It is to be understood that the conditions set forth therein are illustrated only and not intended to be limiting. Unless otherwise stated, the waste liquors are derived from the pulping of Douglas fir.

*Example 1*

An apparatus similar to that illustrated in FIGURE 1 was employed. The kiln was an iron pipe approximately 1 inch in diameter, and was fitted with a long screw. The pipe was then heated by means of a tubular electric resistance heater to 350° C., and was held in a slightly inclined position, as illustrated. Superheated steam was passed through this kiln and out into the water cooled condenser. Eighty-seven grams of black liquor having a solids content of 52% was added drop-wise onto the screw rotating at about 30 r.p.m. At the completion of the addition, an oil was extracted with benzene from the aqueous, condensed pyrolyzate gathered in the pyrolyzate receiver. Upon drying and removing the benzene, 1.74 grams of oil were obtained. This was found by chromatography analysis to consist of 36% guaiacol, for a yield of 1.4% guaiacol based on the black liquor solids, or over 4% based on the lignin content of the black liquor.

Example 2

Into the same apparatus employed in Example 1, but heated to 400° C., a total of 99.6 grams of 52% solids black liquor was added drop-wise. After the addition was complete, benzene extraction gave 5.1 grams of oil containing 14% guaiacol by chromatographic analysis. This corresponds to a yield of 1.4% guaiacol based on the black liquor solids. It is thus seen that raising the temperature increases the oil yield, but does not increase the guaiacol yield.

Example 3

Into the same equipment as employed in Example 1, a total of 1,493.4 grams of liquor of 51.5% solids content was pyrolyzed at a kiln temperature of 500° C. Upon extraction with benzene as described in Example 1, 77.5 grams of oil (10.1% yield) were obtained. This oil was determined to contain 15% guaiacol by gas chromatography for a yield of 1.5% based on the black liquor solids. The crude oil was distilled at 23 millimeters pressure to give 40.6 grams distillate and a tar residue of 32.3 grams. The distillate was treated with 10% sodium hydroxide and thus separated into phenolics and neutrals. Upon acidification of the caustic solution, 38.5 grams of phenolic material were obtained. This material was fractionated by means of a thirty-six inch spinning band column into three fractions:

| | Grams |
|---|---|
| Fraction 1 (boiling point up to 200° C.) | 6.7 |
| Fraction 2 (boiling point 200°–210° C.) | 14.6 |
| Fraction 3 (boiling point above 210° C.) | 16.0 |

Fraction 2 was found to be largely guaiacol by chromatographic analysis. A 2,4 dinitrobenzoate derivative of Fraction 2 had a melting point of 141.0–143.5° C. (The melting point of this derivative for commercial guaiacol is 143–145.5° C.) There was no depression of the melting point of a mixture of the derivatives.

Fraction 3 was found by chromatographic analysis to contain a substantial amount of lower alkyl substituted guaiacols. In the fraction, there was approximately 2 grams of 4-methyl guaiacol, 3 grams of 4-ethyl guaiacol, and 1 gram of 4-propyl guaiacol. These lower alkyl substituted guaiacols are useful as chemical intermediates in the synthesis of various organic compounds such as vanillin, the alkyl group being oxidized off by conventional procedures.

Example 4

The apparatus described in Example 1 was employed. Soda liquor of 42% solids was fed into the kiln which was heated at a temperature of 400° C. From 41.7 grams of the 42% solids liquor, there was obtained 0.8 gram of oil containing 15% guaiacol for a yield of 0.7% based on the liquor solids.

Example 5

The pyrolysis equipment illustrated in FIGURE 1 was employed wherein the heater 14 was an insulated steam jacket. Four external electric heaters in parallel were placed around the steam jacket to minimize heat losses. A hot plate was placed below the liquor inlet to aid in drying the incoming feed. The temperature in the inlet area was maintained between 250–300° C. Low pressure (6 p.s.i.) steam was superheated in an Edwin L. Weigand Company 240-volt, three-phase, three-kilowatt steam superheater. Kraft black liquor with a 48% solids content was added drop-wise from a separatory funnel into the rotating screw. The screw was rotated at 15 r.p.m. for runs 1 through 5; rotation was increased to 30 r.p.m. for runs 6–16. Temperature of the superheated steam was measured with thermocouples just before it left the superheater and upon its leaving the steam jacket. The pyrolysis temperature was obtained by taking the average of these two temperatures. The experimental conditions and yields for runs 1 through 16 are given in Table I below:

TABLE I.—PYROLYSIS OF BLACK LIQUOR—APPARATUS OF FIG. 1

| | Pyrolysis Conditions | | | | | | Yields | | | |
|---|---|---|---|---|---|---|---|---|---|---|
| | | | | | | | Oil | | Guaiacol | |
| Run No. | Black liquor solids pyrolyzed, g. | Addition rate, g. solids per min. | Temp. of steam from superheater, ° C. | Temp. effluent steam, ° C. | Average pyrolysis temp., ° C. | Temp. direct steam, ° C. | Direct steam flow rate, ml. condensate per min. | Oil obtained, g. | Oil obtained based on solids percent | Guaiacol in oil, percent | Guaiacol based on solids, percent |
| 1 | 46.5 | 0.5 | 440 | 395 | 417 | | | 3.5 | 7.5 | 10 | 0.8 |
| 2 | 51.8 | 0.5 | 415 | 360 | 387 | | | 3.0 | 5.8 | 17 | 1.0 |
| 3 | 51.8 | 0.5 | 372 | 340 | 356 | | | 2.4 | 4.6 | 22 | 1.0 |
| 4 | 51.1 | 0.6 | 440 | 395 | 417 | | | 3.5 | 6.9 | 9 | 0.6 |
| 5 | 51.1 | 1.0 | 421 | 385 | 403 | | | 4.1 | 8.0 | 12 | 1.0 |
| 6 | 51.1 | | 440 | 395 | 417 | | | | | | |
| 7 | 51.1 | 0.7 | 425 | 390 | 407 | | | 2.7 | 5.3 | 2 | 0.1 |
| 8 | 50.4 | 0.7 | 430 | 400 | 415 | | | 2.8 | 5.6 | 14 | 0.8 |
| 9 | 26.7 | 0.5 | 425 | 350 | 387 | 367 | 9 | 1.3 | 4.9 | 12 | 0.6 |
| 10 | 34 | 0.5 | 415 | 375 | 395 | 400 | 7 | 2.4 | 7.0 | 12 | 0.6 |
| 11 | 26.7 | | 420 | 370 | 390 | 400 | 3.5 | | | | |
| 12 | 51.1 | 0.7 | 455 | 435 | 445 | | | 3.3 | 6.5 | 12 | 0.8 |
| 13 | 48 | 0.5 | 445 | 425 | 435 | | | 3.5 | 7.3 | 9 | 0.7 |
| 14 | 48 | 0.5 | 500 | 390 | 445 | | | 3.3 | 6.9 | 8 | 0.6 |
| 15 | 48 | 0.5 | 385 | 325 | 355 | | | 2.2 | 4.6 | 19 | 0.9 |
| 16 | 52.1 | 0.6 | 495 | 425 | 460 | | | 3.3 | 6.4 | 11 | 0.7 |

In runs 1 through 8 and 13 through 15, conduit 16 illustrated in FIGURE 1 was closed and the pyrolyzate was removed through conduit 17. In runs 9 through 12 and 16, pyrolyzate was removed through conduit 16, conduit 17 being closed.

In run 6, black liquor pyrolysis was tried at reduced pressure. A vacuum line was attached to the side arm of the adapter connecting the water cooled condenser with the oil and water receiver (conduit 20). Soon after initiation of pyrolysis the condenser began filling with solid black particles but no oil, indicating incomplete pyrolysis. The experiment was terminated.

In run 7 the feed consisted of 107 grams of kraft black liquor at 48% solids, and 31 grams of sodium sulfide nonahydrate ($Na_2S \cdot 9H_2O$). The mixture was heated with stirring until a solution was obtained. This solution was then introduced into the pyrolysis equipment as in the other examples.

In runs 9 through 11 direct steam was fed countercurrent to the black liquor flow. Low pressure (about 6 p.s.i.) steam was preheated to 320° C. in a flame heated Fisher laboratory superheater, then heated to the desired temperature with a Hevi-duty Company's type 70T, 750-watt tube furnace as the steam passed through it in 3/8 inch copper tubing. The direct superheated steam then entered the pyrolysis equipment through the lower conduit 17. The flow rate of the direct steam was measured by the volume of its condensate (see Table I). The pyrolyzate and the direct steam then left the pyrolysis equipment through the upper conduit 16 where the vapors recondensed in a water cooled condenser. No improvement in guaiacol yield was achieved by this expedient.

In all the runs of this example, the pyrolyzate in the oil and water receiver was extracted with a solvent, followed by drying over anhydrous sodium sulfate or magnesium sulfate, and evaporation of the solvent under reduced pressure. Solvent extraction was necessary not only to collect the oil particles but also to recover dissolved guaiacol from the water phase. (Guaiacol solubility is 1.6 grams in 100 grams of water at 15° C.) Benzene was the solvent employed in runs 1 and 2, but in all other runs benzene was replaced by diethyl ether because of its lower boiling point and ease of removal under reduced pressure. Composition of the oil was determined by a Perkin-Elmer Model 154 Vapor Fractometer with a 10.5 foot column of Celanese Ester No. 9 on Gas Chromatograph Support P. Guaiacol content calculations were based on the counts obtained by Eastman Kodak's Practical Grade guaiacol.

Example 6

In this example a fused salt bath was employed as the heating means for the apparatus illustrated in FIGURE 1. The salt mixture consisted of 40% sodium nitrite, 7% sodium nitrate, and 53% potassium nitrate by weight. The kiln employed was a black iron pipe, 1 inch in diameter and 2 feet long, with a screw 22 inches long turned by a Vickers drive (¾ h.p. hydraulic transmission). An 11 inch section of the pipe passed through the salt bath. A hot plate was placed below the black liquor inlet as in the previous runs to aid in drying the incoming liquor. Kraft black liquor containing 51.4% solids was added to the pyrolyzer as in the previous runs. The screw was turned at 30 r.p.m. in runs 21 through 23, then the rotation was increased to 40 r.p.m. in runs 24 through 41. The pyrolysis conditions and yields for runs 21 through 41 are described in Table II below:

current to the black liquor flow results in guaiacol yields in the range of 1.8% to 2.1% based on black liquor solids. The results obtained in runs 30 through 36 show that it is important to remove the pyrolysis products rapidly before they have a chance to break down or decompose. Sweeping the pyrolysis zone with direct steam aids in accomplishing the removal of guaiacol from the pyrolysis site, as shown in these runs.

In runs 38 and 39, Orzan SL–50, which is a sodium base lignin sulfonate product having 52% solids, was pyrolyzed as in the previous examples. In run 39 a slurry consisting of 5.6 grams anhydrous sodium carbonate in 9.4 milliliters of water was added to 107 grams of Orzan SL–50 to see if guaiacol formation was enhanced. This is 10% sodium carbonate based on the Orzan SL–50 solids. The mixture was stirred until a solution resulted and this solution was then pyrolyzed under the conditions shown on Table II. There does not appear to be any increase in guaiacol yield by adding sodium carbonate to sulfite waste liquor.

Calcium based sulfite liquor with 58.4% solids was pyrolyzed in run 40. Runs 38 through 40 on Table II show that guaiacol can be obtained from spent liquors other than kraft black liquor.

In run 41 a slurry of 5.1 grams of anhydrous sodium carbonate was added to 10 milliliters of water and this slurry added to 100 grams of 51.4% solids sulfate (kraft) black liquor. This mixture was then stirred until a solution resulted, and the solution was then pyrolyzed to obtain guaiacol. Sodium carbonate was added to see if it aided in the guaiacol formation from lignin. There does not appear to be any increase in guaiacol yield in this run TABLE II.—FUSED SALT AS HEAT EXCHANGE MEDIUM FOR BLACK LIQUOR PYROLYSIS—APPARATUS OF FIG. 1

| | Pyrolysis Conditions | | | | | | Yields | | | |
|---|---|---|---|---|---|---|---|---|---|---|
| | | | | | | | Oil | | Guaiacol | |
| Run No. | Black liquor solids pyrolyzed, g. | Addition rate, g. solids per min. | Distillate outlet used | Pyrolysis temp. (salt Bath) ° C. | Temp. direct steam ° C. | Steam flow rate, ml. condensate per min. | Oil obtained, g. | Oil obtained, based on solids percent | Guaiacol in oil percent | Guaiacol based on solids percent |
| 21 | 152.4 | 0.9 | Lower | 270 | | | 14.1 | 9.3 | 6 | 0.6 |
| 22 | 209.5 | | do | 500 | | | 16.5 | 7.9 | 6 | 0.5 |
| 23 | 228 | | do | 500 | | | 15.5 | 6.8 | 6 | 0.4 |
| 24 | 57 | 0.5 | do | 520 | | | | | | |
| 25 | 52.6 | 0.5 | do | 410 | | | 3.6 | 6.8 | 14 | 1.0 |
| 26 | 311 | | Upper | 510 | | | 23.0 | 7.4 | 14 | 1.0 |
| 27 | 102 | 1.4 | do | 450 | | | 7.3 | 7.2 | 19 | 1.4 |
| 28 | 102.8 | 1.7 | do | 400 | | | 5.5 | 5.4 | 26 | 1.4 |
| 29 | 101 | 1.7 | do | 425 | | | 6.1 | 6.0 | 20 | 1.2 |
| 30 | 102.8 | 0.5 | do | 450 | 410 | 5 | 11.0 | 11.2 | 19 | 2.1 |
| 31 | 50.8 | 0.6 | do | 500 | 400 | 5 | 5.6 | 11.0 | 19 | 2.1 |
| 32 | 51 | 0.6 | do | 450 | 420 | 5 | 5.7 | 11.2 | 19 | 2.1 |
| 33 | 25.2 | 0.3 | do | 450 | 420 | 10 | 2.6 | 10.3 | 17 | 1.8 |
| 34 | 50.8 | | do | 450 | 420 | 7 | | | | |
| 35 | 30.8 | 0.5 | do | 450 | 420 | 3.5 | 3.2 | 10.4 | 19 | 2.0 |
| 36 | 39.5 | 0.4 | Lower | 450 | 400 | 5 | 4.1 | 10.4 | 18 | 1.9 |
| 37 | 50.9 | 0.5 | do | 500 | 390 | 5 | 5.5 | 10.8 | 11 | 1.2 |
| 38* | 52 | 0.6 | do | 450 | 390 | 5 | 1.5 | 2.9 | 13 | 0.4 |
| 39* | 55.6 | 0.5 | do | 450 | 390 | 5 | 1.3 | 2.3 | 20 | 0.5 |
| 40* | 32.3 | 0.5 | Upper | 450 | 450 | 5 | 1.6 | 5.0 | 6 | 0.3 |
| 41 | 51.4 | 0.4 | do | 450 | 450 | 5 | 4.9 | 9.5 | 19 | 1.8 |

*Sulfite waste liquor.

In runs 21 through 25 the flow of the pyrolyzate was led out through the lower conduit 17. As can be seen from Table II, the guaiacol yields are about the same as in the previous runs. In runs 26 through 29 the pyrolyzate flow was reversed, i.e., the lower pyrolyzate outlet 17 was closed and oil and water were removed through the upper conduit 16. This had the effect that guaiacol that was formed did not have to pass through the entire heating zone in the pyrolysis kiln, but could escape through the upper outlet with less decomposition. It is seen that the yield was increased by employing this expedient.

In runs 30 through 35 direct superheated steam was introduced into the pyrolysis kiln through the lower conduit 17 countercurrent to the black liquor flow. In runs 36 through 39 the steam flow was concurrent with the black liquor flow, but in runs 40 and 41 the steam flow was again countercurrent to the black liquor flow. It can be seen from Table II that introduction of steam counterwhen compared with the guaiacol yields in runs 30 through 32, as may be seen from Table II.

Example 7

In this example the apparatus of FIGURE 1 was employed. Black liquor (656 grams at 53% solids) was pyrolyzed at 415° C. The oil obtained weighed 29.3 grams for a yield of 8.4% on the black liquor solids. The solid pyrolysis residue trapped in receiver 15 weighed 228 grams. Therefore, about 91 grams or 26% of the original black liquor solids wrere converted into noncondensed gases. A sample of these gases was taken in a 250 ml. gas sample bottle. The amounts of hydrogen sulfide, methyl mercaptan and carbon dioxide were determined by a Perkin-Elmer Model 154 Vapor Fractometer with a 7 foot by ¼ inch stainless steel column containing didecyl phthalate. The amounts of carbon monoxide, methane and air (oxygen and nitrogen) were determined by an Aerograph A-350 with a 10 foot by ¼ inch stainless steel column containing silica gel. The results obtained by gas chromatography are shown in Table III below:

TABLE III.—ANALYSIS OF NON-CONDENSED PYROLYSIS GASES

| Gas | Volume Percent Gas | Weight Percent Gas |
|---|---|---|
| Air | 11 | |
| $CH_4$ | 5 | 2.7 |
| $CH_3SH$ | 4 | 6.5 |
| $H_2S$ | 15 | 17.4 |
| CO | 30 | 28.5 |
| $CO_2$ | 30 | 44.9 |
| Total | 95 | 100.0 |

*Example 8*

In this example the apparatus illustrated in FIGURE 2 was employed. The two meshing screws were employed. The right-handed screw was turned by a Vickers drive (¾ h.p. hydraulic transmission). Power was transmitted to the left-handed screw by means of two gears. The pyrolysis pipe was 1 inch black iron pipe 2 feet long. An 11 inch section of the pipe passed through the salt bath employed as the heating means. The salt mixture was the same as the one used in runs 21 through 41. The pyrolysis conditions and yields are described in Tavle IV below:

into the kiln has the advantage of superior heat transfer as the liquor solids are already in particulate form upon introduction. Introduction of concentrated waste liquor at about 60% solids means there is a period of time required to dry the liquor to dryness during which very little pyrolysis action takes place.

The effect of pyrolysis temperature on guaiacol yields was studied in runs 49 through 62. The results obtained indicate that guaiacol yields did not vary significantly over the temperature range used (350 to 485° C.). The oil yields increased with increasing temperature, but the oil was poor in guaiacol.

In the last series of runs (Nos. 63 through 68), the effect of some other variables on guaiacol yields was studied. In run 63 black liquor was pyrolyzed at a relatively low temperature of 325° C. The black liquor addition rate was 0.25 gram of solids per minute with the two meshing screws running at only 10 r.p.m. to provide a longer retention time for the solids in the pyrolysis pipe. These mild pyrolysis conditions did not improve the guaiacol yield, but the oil produced was richer in guaiacol (37%) than in any of the previous runs.

In run 64, 32 grams of the pyrolysis residue from run 63 was slurried with 60 grams of water and the mixture

TABLE IV.—BLACK LIQUOR PYROLYSIS—APPARATUS OF FIG. 2

| Run No. | Pyrolysis Conditions | | | | | Yields | | | |
|---|---|---|---|---|---|---|---|---|---|
| | | | | | | Oil | | Guaiacol | |
| | Black liquor solids pyrolyzed, g. | Liquor inlet used | Addition rate, g. solids per min. | Pyrolysis temperature, °C. | Steam flow rate, ml. condensate per min. | Oi. obtained, g. | Oil obtained based on solids, percent | Guaiacol in oil, percent | Guaiacol based on solids, percent |
| 42 | 27.2 | 22 | 0.8 | 450 | 5 | 2.8 | 10.3 | 13 | 1.3 |
| 43 | 266 | 22 | 1.0 | 450 | 5 | 27.8 | 10.1 | 13 | 1.3 |
| 44 | 121 | 21 | 0.5 | 450 | 5 | 11.9 | 9.8 | 18 | 1.8 |
| 45 | 51.4 | 21 | 0.4 | 500 | 5 | 4.9 | 9.5 | 19 | 1.8 |
| 46 | 25 | 21 | 0.3 | 450 | 6 | 3.0 | 12.0 | 18 | 2.2 |
| 47 | 36 | 21 | 0.3 | 450 | 6 | 3.4 | 9.4 | 20 | 1.9 |
| 48 | 71.5 | 21 | | 450 | 5 | 4.6 | 6.4 | 26 | 1.7 |
| 49 | 60.7 | 21 | 0.4 | 350 | 5 | 3.4 | 5.6 | 33 | 1.9 |
| 50 | 73 | 21 | 0.4 | 365 | 5 | 4.6 | 6.3 | 32 | 2.0 |
| 51 | 77 | 21 | 0.4 | 375 | 5 | 5.8 | 7.5 | 25 | 1.9 |
| 52 | 77 | 21 | 0.4 | 385 | 5 | 6.2 | 8.0 | 24 | 1.9 |
| 53 | 77 | 21 | 0.4 | 395 | 5 | 5.9 | 7.7 | 25 | 1.9 |
| 54 | 77 | 21 | 0.4 | 405 | 5 | 5.9 | 7.7 | 25 | 1.9 |
| 55 | 77 | 21 | 0.4 | 415 | 5 | 6.5 | 8.5 | 23 | 2.0 |
| 56 | 77 | 21 | 0.4 | 425 | 5 | 7.0 | 9.1 | 21 | 1.9 |
| 57 | 77 | 21 | 0.5 | 435 | 5 | 7.5 | 9.7 | 20 | 1.9 |
| 58 | 77 | 21 | 0.5 | 445 | 5 | 7.5 | 9.7 | 20 | 1.9 |
| 59 | 77 | 21 | 0.5 | 455 | 5 | 7.6 | 9.9 | 18 | 1.8 |
| 60 | 77 | 21 | 0.5 | 465 | 5 | 7.6 | 9.9 | 18 | 1.8 |
| 61 | 77 | 21 | 0.5 | 475 | 5 | 7.8 | 10.0 | 18 | 1.8 |
| 62 | 77 | 21 | 0.5 | 485 | 5 | 7.8 | 10.0 | 17 | 1.7 |
| 63 | 32.4 | 21 | 0.25 | 325 | 5 | 1.3 | 4.0 | 37 | 1.5 |
| 64 | 32 | 21 | 0.25 | 350 | 5 | 0.5 | 1.6 | 0 | 0 |
| 65 | 79.5 | 22 | 0.4 | 415 | 4 | 7.0 | 8.8 | 14 | 1.2 |
| 66 | 79.5 | 22 | 0.4 | 350 | 4 | 5.0 | 6.3 | 26 | 1.6 |
| 67 | 79.5 | 21 | 0.4 | 415 | 2 | 5.8 | 7.3 | 22 | 1.6 |
| 68 | 74 | 21 | 0.4 | 415 | 2 | 11.7 | | 11 | 1.8 |

NOTE.—Runs 42 through 62 and 64 through 68 were run with a screw rotation of 40 r.p.m. Run 63 was run at a screw rotation of 10 r.p.m.

In runs 42 through 62, direct superheated steam was introduced into the pyrolysis pipe through the lower conduit 27 countercurrent to the black liquor flow. Steam was superheated in the same manner as in runs 30 through 41. The direct superheated steam used in runs 42 through 62 was heated to the same temperature as the salt bath in each particular run. The hot plate was used as the auxiliary heat source in aiding in black liquor drying in the first inlet area below conduit 21 (runs 44 through 62). In runs 42 and 43 the second liquor inlet conduit 22 was used. When the first liquor inlet conduit 21 was used in the next two runs (Nos. 44 and 45), higher guaiacol yields were obtained. It is probable that the lower guaiacol yields in the runs 42 and 43 was due to the fact that the guaiacol formed on pyrolysis had to go through a longer hot zone where decomposition of guaiacol could take place.

Dried black liquor solids were used as a feed in runs 46 and 47. The black liquor solids were obtained by drying concentrated black liquor at 110° C. to a constant weight. The dried black liquor solids were then dropped onto the rotating screw through the first inlet conduit 21. Separate drying of the black liquor prior to introduction pyrolyzed under conditions shown in Table III to obtain an additional quantity of guaiacol. A small amount of a very viscous oil (0.5 gram) was isolated from the aqueous pyrolyzate, but the oil did not contain any guaiacol.

In runs 65 and 66 the second inlet conduit 22 was used to introduce black liquor into the pyrolysis pipe. At a pyrolysis temperature of 415° C. the guaiacol yield was only 1.2% on solids basis. At milder pyrolysis conditions in run 66, the guaiacol yield was higher (1.6%). Thus, the second inlet did not seem to have any advantages over the first one.

The effect of direct steam flow rate on guaiacol yields was studied in run 67. The steam flow rate, as measured by the condensate, was cut down from the usual 5 milliliters per minute to 2 milliliters per minute. The result was a 1.6% yield of guaiacol versus the 1.9 to 2% obtained in runs 49 through 58. This indicates that a certain volume and velocity of steam is necessary to sweep out guaiacol from the pyrolysis zone, and also again illustrates that it is important to remove the pyrolyzate from the pyrolysis zone as quickly as possible.

In run 68 the feed consisted of 140 grams of kraft black liquor at 53% solids and a distillation residue of 10 grams. The distillation residue was obtained by combining the oil from runs 53 through 61 and removing the fraction rich in guaiacol, i.e., the fraction boiling below 130° C. at 15 millimeters mercury. Gas chromatography indicated this fraction contained 56% guaiacol by weight. No guaiacol was found in the distillation residue. This mixture was then pyrolyzed under the condition shown in Table III. It was expected that the distillation residue could be pyrolyzed to produce some more guaiacol. However, this was not the case. In run 68 11.7 grams of oil was isolated from the aqueous pyrolyzate, indicating that the net increase in the quantity of oil on black liquor pyrolysis was only 1.7 grams. This oil was very poor in guaiacol (11%).

The foregoing examples were directed to practicing the process of this invention upon coniferous or softwood. The following examples illustrate the process of this invention practiced upon hardwood waste liquor. As mentioned previously, when hardwood waste liquors are employed as the starting material, roughly equal proportions of guaiacol and 2,6-dimethoxyphenol are obtained.

*Example 9*

Hardwood kraft black liquor obtained by pulping southern hardwoods was pyrolyzed in the single screw thermal equipment described in Example 6. With the fused salt bath at 415–420° C., a total of 442 grams of hardwood black liquor of 43.5% solids was added onto the rotating screw; 18.2 grams of oil were obtained. Simple distillation of the oil gave a fraction of 9.87 grams boiling between 90–150° C. at 13 mm. mercury pressure. This fraction was found by gas chromatography to contain 32% by weight 2,6-dimethoxyphenol and 20% by weight guaiacol for a 2,6-dimethoxyphenol yield of 1.5% by weight and a guaiacol yield of 0.94% by weight based on solids. The remainder of this fraction contains a substantial amount of lower alkyl substituted guaiacol and lower alkyl substituted 2,6-dimethoxyphenol, such as the 4-methyl, 4-ethyl and 4-propyl substituted guaiacols and dimethoxyphenols.

Simple distillation of the 90–150° C./13 mm. Hg cut gave oil that was found by gas chromatography to contain 59% by weight 2,6-dimethoxyphenol and 0.2% by weight guaiacol. A tribromo derivative was prepared from this oil. After two recrystallizations, the 3,4,5-tribromo-2,6-dimethoxyphenol isolated from the pyrolysis oil had a similar melting point to 3,4,5-tribromo-2,6-dimethoxyphenol prepared from commercial 2,6-dimethoxyphenol. There was no depression of the mixed melting point.

*Example 10*

Hardwood sodium base sulfite spent liquor of 52% by weight solids was pyrolyzed in the thermal equipment described in Example 6. With the fused salt bath at 415–420° C., a total of 100 grams of the liquor was added onto the rotating screw. There were obtained 1.8 grams of oil or a yield of 3.5% by weight, based on the solids. This oil was found by gas chromatography to contain 16% by weight 2,6-dimethoxyphenol for a yield of 0.55% by weight, based on the solids. This same oil also contained 10% by weight guaiacol for a guaiacol yield of 0.34% by weight, based on solids.

*Example 11*

Calcium base hardwood sulfite spent liquor of 55% by weight solids was pyrolyzed in the same way as in Example 10. This resulted in a 0.4% by weight yield of 2,6-dimethoxyphenol and a 0.2% by weight yield of guaiacol, based on the liquor solids.

Having described the nature of our invention and the manner of its operation, what we claim is:

1. The process of preparing a methoxy phenol from waste pulping liquor comprising:
    evaporating said waste liquor substantially to dryness;
    subjecting the resulting solids to tumbling; during said tumbling, subjecting said solids to a rapid pyrolysis at a temperature of from about 350° C. to 500° C. to cause the formation of a pyrolyzate containing said methoxy phenol;
    substantially immediately and continuously removing said pyrolyzate from said pyrolysis zone as it is formed;
    and recovering said methoxy phenol from said pyrolyzate.

2. The process of claim 1 wherein said waste pulping liquor is sulfate waste liquor.

3. The process of claim 1 wherein said waste pulping liquor is derived from the pulping of coniferous wood and said methoxy phenol is selected from the group consisting of guaiacol, lower alkyl substituted guaiacols, and mixtures thereof.

4. The process of claim 1 wherein said waste pulping liquor is derived from the pulping of hardwood and said methoxy phenol is selected from the group consisting of guaiacol, lower alkyl substituted guaiacols, 2,6-dimethoxyphenol, lower alkyl substituted 2,6-dimethoxyphenol, and mixtures thereof.

5. The process of preparing a methoxy phenol from waste pulping liquor comprising:
    evaporating said waste liquor substantially to dryness at a temperature less than that at which said methoxy phenol is formed, but high enough to effect evaporation at a reasonable rate to thereby produce dried waste liquor solids;
    forming said dried liquor solids into a particulate solids;
    feeding said particulate solids into a pyrolysis zone at a temperature of from about 350° C. to 500° C., and subjecting said particulate solids to tumbling while in said pyrolysis zone to thereby effect the formation of a pyrolyzate containing said methoxy phenol;
    substantially immediately and continuously removing said pyrolyzate from said pyrolysis zone as it is formed;
    and recovering said methoxy phenol from said pyrolyzate.

6. The process of claim 5 wherein said waste pulping liquor is sulfate waste liquor.

7. The process of claim 5 wherein said waste pulping liquor is derived from the pulping of coniferous wood and said methoxy phenol is selected from the group consisting of guaiacol, lower alkyl substituted guaiacols, and mixtures thereof.

8. The process of claim 5 wherein said waste pulping liquor is derived from the pulping of hardwood and said methoxy phenol is selected from the group consisting of guaiacol, lower alkyl substituted guaiacols, 2,6-dimethoxyphenol, lower alkyl substituted 2,6-dimethoxyphenol, and mixtures thereof.

9. The process of preparing methoxy phenol from waste pulping liquor comprising:
    evaporating said waste liquor substantially to dryness at a temperature less than that at which said methoxy phenol is formed, but high enough to effect evaporation at a reasonable rate to thereby produce dried waste liquor solids;
    forming said dried liquor solids into particulate solids;
    feeding said particulate solids into a pyrolysis zone at a temperature of from about 350° to 500° C., and subjecting said particulate solids to tumbling while in said pyrolysis zone to thereby effect the formation of a pyrolyzate containing said methoxy phenol;
    substantially immediately and continuously removing said pyrolyzate from said pyrolysis zone as it is formed by sweeping said pyrolyzate out of said pyrolysis zone with a gas;
    and recovering said methoxy phenol from said pyrolyzate.

10. The process of claim 9 wherein said waste pulping liquor is sulfate waste liquor.

13

11. The process of claim 9 wherein said waste pulping liquor is derived from the pulping of coniferous wood and said methoxy phenol is selected from the group consisting of guaiacol, lower alkyl substituted guaiacols, and mixtures thereof.

12. The process of claim 9 wherein said waste pulping liquor is derived from the pulping of hardwood and said methoxy phenol is selected from the group consisting of guaiacol, lower alkyl substituted guaiacols, 2,6-dimethoxyphenol, lower alkyl substituted 2,6-dimethoxyphenol, and mixtures thereof.

13. The process of claim 9 wherein:

14 said waste liquor is dried substantially to dryness at a temperature of from 100° C. to 150° C.

14. The process of claim 9 wherein said particulate solids is composed of particles having a size in the range of from about 20 mesh to about 200 mesh, U.S. Sieve.

References Cited

UNITED STATES PATENTS

| | | | |
|---|---|---|---|
| 2,393,700 | 1/1946 | Molinari. | |
| 2,964,569 | 12/1960 | Chenicek | 260—613 |
| 3,326,980 | 6/1967 | Goheen | 260—124 |

BERNARD HELFIN, *Primary Examiner.*